3,070,979
COMPOUND SHAFT COUPLING
Eugene E. Shipley, Middleton, and Henry Sorensen, Marblehead, Mass., assignors to General Electric Company, a corporation of New York
Filed Jan. 29, 1962, Ser. No. 169,233
5 Claims. (Cl. 64—9)

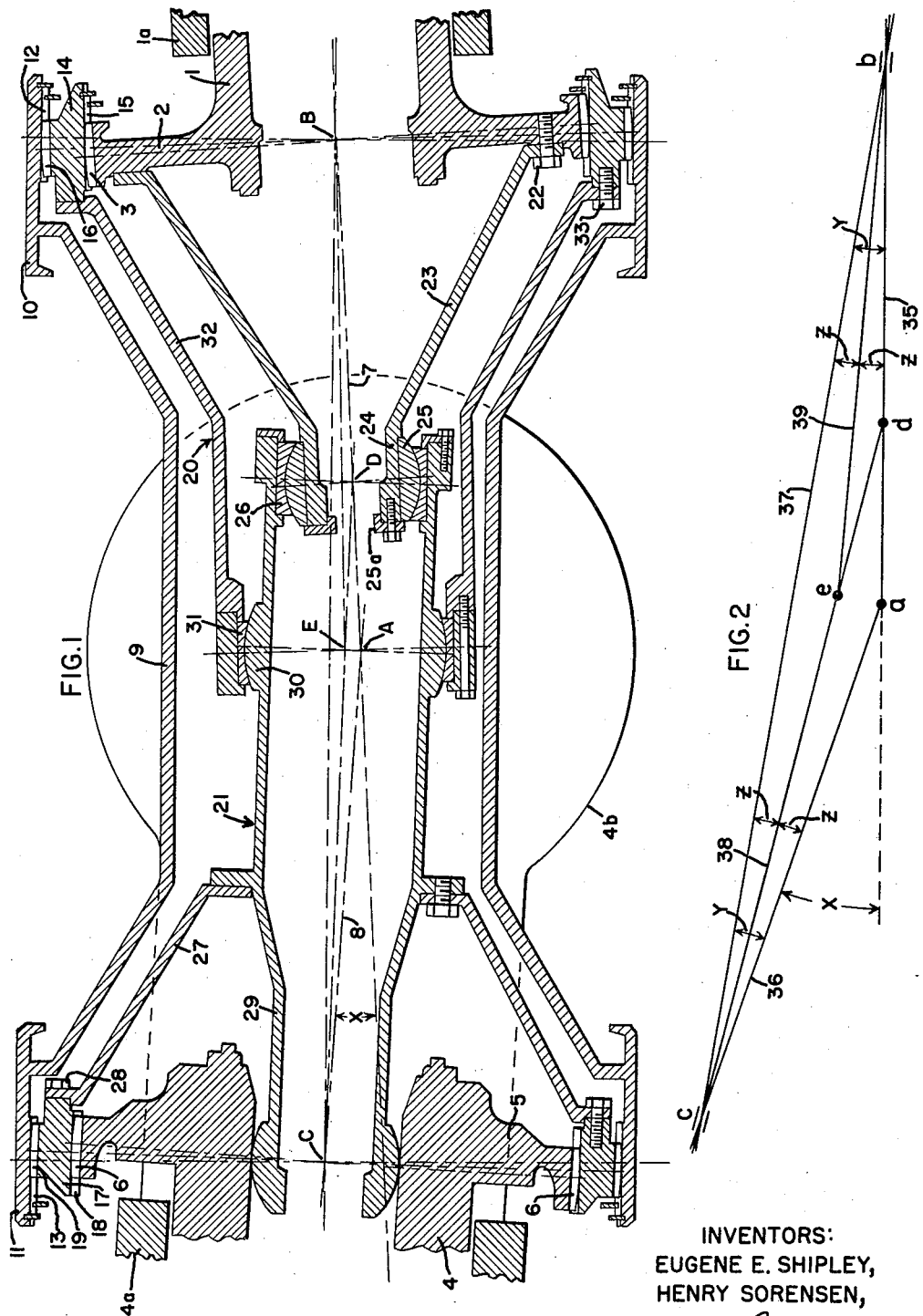
INVENTORS:
EUGENE E. SHIPLEY,
HENRY SORENSEN,
BY W. C. Crutcher
THEIR ATTORNEY.

This invention relates to an improved type of compound coupling for connecting rotating drive shafts arranged to pivot with respect to one another, which provides for a large amount of angular misalignment between shaft axes.

Compound couplings have been known of the type where a torque sleeve couples axially separated driving and driven shafts by means of spline tooth connections. Dividing the misalignment at each end of the torque sleeve has been accomplished by placing the shaft pivot point midway between spline teeth. The degree of misalignment permitted by such a coupling has usually been limited by interference and load-carrying capabilities of the meshing spline teeth. The interference problem has been reduced, somewhat, by "crowning" the spline teeth by cutting them on the arc of a circle, but this reduces their load-carrying capability. Therefore, the amount of angular misalignment that can be accommodated by simple splined flexible coupling with an intermediate torque sleeve is only on the order of 1½ degrees for each set of coupling teeth, giving a total permissible misalignment of 3 degrees. Of course, the degree of permissible misalignment is also affected by the speed and load, and these figures are only indicative of typical permissible misalignments.

One application of a compound coupling is found in hydrofoil vessels where the drive shaft is fixed and the other shaft is mounted in a housing carrying the propeller and propulsion gearing. At high speeds, the vesesl may be steered by rotating the housing and the propeller slightly at angles on the order of 7 degrees. Of course, the shafts must continue to transmit torque as the steering is accomplished.

Accordingly, one object of the present invention is to provide an improved compound shaft coupling for accommodating a large amount of angular misalignment.

Another object of the inventin is to provide an improved compound shaft coupling wherein the angular misalignment between a single set of coupling teeth is very much less than the total misalignment of the coupled shafts.

Another object of the invention is to provide a coupling suitable for transmitting power to a steerable housing in a hydrofoil vessel.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a cross-sectional view of the coupling with driving and driven shafts angularly misaligned, and FIG. 2 is a diagrammatic view of an equivalent linkage, illustrating the relative movement of the coupling members.

Briefly stated, the invention is practiced by providing radially intermediate coupling members for coupling the torque tube to the respective shafts, together with means to adjust the axes of the intermediate coupling members relative to the axes of the shaft and torque tube members, so as to reduce the degree of misalignment in each single set of coupling teeth.

Referring now to FIG. 1 of the drawing, a drive shaft 1 rotatably journaled in fixed bearings 1a terminates in a radial flange 2 having external, circumferentially-spaced spline teeth 3 thereon. Spline teeth 3, as well as the other spline teeth to be described, may be crowned as shown to increase their capabilities for misalignment.

Similarly, a driven shaft 4 rotatably journaled in bearings 4a terminates in a flange 5 having external spline teeth 6 on the rim thereof. Driven shaft 4 is arranged to pivot with respect to drive shaft 1 about a point A shown as the intersection of centerlines 7, 8 of the drive shaft and driven shaft respectively. The structure for causing shafts 1, 4 to pivot about the fixed point A is diagrammatically illustrated by the pedestal 4b which carries bearings 4a. Hence, the drive shaft and driven shaft can be angularly misaligned by an angle X, which can change both in magnitude and direction as the driven shaft 4 pivots. A plane taken through drive shaft spline teeth 3 intersects the drive shaft centerline 7 at point B, while a plane through the driven shaft spline teeth 6 intersects the driven shaft centerline 8 at a point C.

Extending axially between flanges 2, 5 is a hollow torque tube 9 terminating on either end thereof in cylindrical portions 10, 11 with internal spline teeth 12, 13 respectively, which are radially spaced from spline teeth 3, 6, respectively on the shafts.

An intermediate coupling ring 14 couples shaft 1 with torque tube 9 by means of internal and external spline teeth 15, 16 meshing with spline teeth 3, 12 respectively. Similarly, a second intermediate coupling ring 17 couples torque tube 9 with driven shaft 4 by means of internal and external spline teeth 18, 19 meshing with spline teeth 6, 13 respectively. Since the torque tube 9 is held radially spaced at either end thereof from drive shaft 1 and driven shaft 4 by means of intermediate coupling rings 14, 17, it will be apparent that the centerline of torque tube 9 must lie along the line BC.

The intermediate coupling rings 14, 17 are attached to guiding members 20, 21 respectively, which serve to control the angles which the axes of the rings 14, 17 make with the torque tube axis and the shaft axes.

Guiding member 21 is piloted from the drive shaft 1, while guiding member 20 is piloted from guiding member 21, as follows: Attached to flange 2 of drive shaft 1 by bolts 22 is a conical extension 23 terminating in a stub 24. A hollow semispherical adapter 25 held in place by clamps 25a converts stub 24 to a ball member.

One end of guiding member 21 is freely rotatable about the adapter 25 by means of a socket 26 disposed in the end thereof. A plane taken through the center of adapter 25 intersects the drive shaft centerline at point D, and one end of guiding member 21 thus pivots about this point. The other end of guiding member 21 includes a hollow conical member 27 attached to intermediate coupling ring 17 by means of bolts 28.

Thus, the axis of guiding member 21, hence coupling ring 17, lies along line CD.

The guiding member 21 also includes an axially extending portion 29 piloted within the bore of driven shaft 4. However, the extension 29 is for engaging and disengaging the coupling teeth 6 from teeth 18 and is not necessary for the practice of the present invention.

The guiding member 21 also includes an enlarged portion 30 disposed at a particular point along the length thereof and having a semispherical surface to provide a pivot point. A mating socket 31 attached to one end of guiding member 20 causes one end of member 20 to be freely rotatable about guiding member 21. The other end of guiding member 20 comprises a conical portion 32 which is attached to intermediate coupling ring 14 by means of bolts 33. A plane taken through the center of socket 31 intersects the centerline of guiding member 20 at point E. Thus the axis of guiding member 20, hence coupling ring 14, lies along the line EB.

In accordance with the invention, the intermediate coupling ring 14 serves to divide the angular misalignment between the drive shaft 1 and torque tube 9 into two smaller misalignments, while the intermediate coupling ring 17 serves to divide the angular misalignment between torque tube 9 and driven shaft 4 into similarly smaller misalignments. Preferably the angular misalignment between shaft members is divided into four equal portions, so that the misalignment existing in any set of coupling teeth is only one-fourth that of the total misalignment between shafts. This is done by selecting the location of the pivot points of the guiding members 20, 21 so that the axes of the guiding members bisect the angles made by the axis of the torque tube 9 with the respective shaft axes.

The operation will be made more clear by reference to FIG. 2 which is an equivalent linkage with linkage rods taking the place of the centerlines of the members, and with pivoted connections a, e and d representing the pivot points A, E and D of the coupling members, and with the sliding joints b, c representing points B and C of FIG. 1. The angles have been greatly exaggerated for purpose of explanation. In FIG. 2, the centerline of the drive shaft 1 is represented by link 35, and the centerline of driven shaft 4 is represented by link 36. The two pivot relative to one another about point a and form a total angular misalignment of X. The centerline of the torque tube is represented by link 37 and it will be observed that if the lengths of links 35 and 36 are selected to be equal, then each of the shafts will be misaligned with the torque tube by an angle Y which is only one-half of angle X. This is the case in the ordinary compound coupling with a connecting torque tube.

The centerline of the guiding member 21 is represented by link 38 and it is pivoted to link 35 at point d, which is selected to be of such a distance along link 35 that link 38 bisects angle Y. The proper location for pivot point d can be computed from trigonometric relations in a manner known to those skilled in the art, and here is located approximately one-third of the distance from a to b. Since link 38 always bisects the angle Y, no matter what position links 35, 36 take, it forms equal angles Z with links 36, 37. Angle Z is one-half of angle Y, and is one-fourth of angle X. Thus, the outer and inner teeth of the intermediate coupling ring 17 are each misaligned with the teeth of the torque tube 9 and with the teeth of the driven shaft 4 respectively by an angle which is only one-fourth of that of the total shaft misalignment.

Similarly, the link 39 represents the centerline of the guiding means 20. This is connected to link 38 at pivot point e. The location of e along the link 38 is selected such that link 39 bisects the angle Y between links 35, 37, forming equal angles Z therewith. Each angle Z is only one-half of angle Y and one-fourth of the total misalignment angle. Thus, the outer and inner teeth of the intermediate coupling ring 14 are also misaligned with the teeth of the torque tube 9 and with the teeth of the drive shaft 1 respectively by an angle which is only one-quarter of the total shaft angular misalignment. The location of point e along link 38 can be computed in the same manner as before and is determined by the lengths of links 35, 38. Here, in order to bisect angle Y, point e is located approximately one-fourth of the distance from d to c, or in other words, very close to the point a.

Although the dimensions selected for the guiding member pivot points d, e are shown such that the angular misalignment is equally divided between four sets of teeth, the invention is by no means limited to this arrangement. Any arrangement which guides links 38, 39 so that they lie within the triangle formed by links 35, 36, 37 will serve to reduce misalignment in individual sets of teeth. For example, the outer set of teeth on each end might be designed to carry a greater degree of misalignment than the inner teeth by merely relocating the pivot points corresponding to d, e. Also one end of the coupling can carry a greater misalignment than the other end by placing pivot point a off-center. It will also be apparent that the arrangement could further be compounded by additional radially intermediate coupling rings, each being guided in turn from the guiding means for a preceding coupling ring. Thus the arrangement can be built up to cover large amounts of misalignment.

Thus, the compound shaft coupling shown, by means of intermediate coupling rings connecting the torque tube with the shaft on either end, and with additional means to cause the coupling rings to substantially bisect the angles formed between the torque tube and the respective shafts, is able to undergo approximately four times the misalignment which would be provided in a single set of meshing teeth, and approximately two times the degree of misalignment which would be provided by a simple arrangement consisting of a torque tube coupling two shafts.

Other modifications and advantages of the invention will occur to those skilled in the art, and it is intended to cover in the appended claims all such modifications as fall within the true spirit and scope of the invention.

What we claim as new and desire to secure by Letters Patent of the United States is:

1. A compound coupling comprising a first shaft member defining coupling spline teeth thereon, a first intermediate coupling ring defining spline teeth meshing with said first shaft spline teeth and also defining additional spline teeth thereon, a second shaft member axially spaced from and pivotable with respect to said first shaft member about a fixed point between shaft members and defining spline teeth, a second intermediate coupling ring defining spline teeth meshing with said second shaft spline teeth and also defining additional spline teeth thereon, a torque tube extending between shafts and defining spline teeth at either end thereof meshing with said additional spline teeth of the first and second intermediate coupling rings, the axes of said torque tube and said first and second shafts forming a triangle when the first and second shafts are misaligned, and means guiding the first and second intermediate coupling rings so that their axes fall within said triangle, whereby said first and second intermediate coupling rings serve to reduce the angular misalignment between sets of meshed spline teeth.

2. A compound coupling comprising a first shaft member defining spline teeth thereon, a first intermediate coupling ring defining spline teeth meshing with said first shaft spline teeth and defining additional spline teeth thereon, a second shaft member axially spaced from and pivotable with respect to said first shaft about a fixed point between shafts and defining spline teeth, a second intermediate coupling ring defining spline teeth meshing with said second shaft spline teeth and also defining additional spline teeth thereon, a torque tube extending between shafts defining spline teeth at either end thereof meshing with said additional spline teeth on the first and second intermediate coupling rings respectively, first means piloting the first intermediate coupling ring with respect to the second shaft axis so that the axis of the first intermediate coupling ring substantially bisects the angle formed between the axis of the torque tube and the axis of the first shaft, and second means piloting the second intermediate coupling ring with respect to the axis of the first piloting means, so that the axis of the second piloting means substantially bisects the angle formed between the axis of the torque tube and the axis of the second shaft, whereby the total angle of misalignment between the first and second shafts is divided into four substantially equal angles, each accommodated by one set of meshing spline teeth.

3. A compound coupling comprising a first shaft defining external spline teeth thereon, a first intermediate coupling ring defining internal spline teeth meshing with said first shaft external spline teeth, and also defining external spline teeth on the periphery thereof, an axially spaced second shaft defining external spline teeth thereon, a second intermediate coupling ring defining internal spline teeth meshing with said second shaft external spline teeth and also defining external spline teeth thereon, a torque tube extending between shafts defining internal spline teeth at either end thereof meshing with the external spline teeth of said first and second intermediate coupling rings, said first shaft being pivotable with respect to said second shaft about a point substantially midway between the first and second shaft spline teeth, first pivot support means comprising a member connected to the first shaft and extending along the axis thereof between shafts, first guiding means connecting the second intermediate coupling ring to said first pivot point, said first guiding means including second pivot support means between shafts, and second guiding means connected between the first intermediate coupling ring and the second pivot support means, whereby the second intermediate coupling ring is guided with respect to the first shaft while the first intermediate coupling ring is guided with respect to the first guiding means.

4. A compound coupling comprising a first rotating member defining external spline teeth, a second rotating member defining interior spline teeth radially spaced from said first spline teeth, an intermediate coupling ring defining internal and external spline teeth mating with said first and second member spline teeth respectively, said first and second rotating members being pivotable with respect to one another about a fixed point, and means guiding the relative alignment of said intermediate coupling ring so that the axis of the coupling ring always substantially bisects the angle formed between the first and second rotating member axes, whereby meshing spline teeth misalignment is divided into two substantially equal portions.

5. A compound coupling comprising a drive shaft defining external spline teeth thereon aligned with a point B on the drive shaft axis and also including a piloting stub extending beyond said spline teeth along the drive shaft axis, a driven shaft defining external spline teeth thereon, aligned with a point C on the driven shaft axis, said drive shaft being axially spaced from and pivotable with respect to said drive shaft about a point A substantially midway between said points B and C, said piloting stub of the drive shaft being located at a point D substantially one-third of the distance from said point A to said point B, first and second intermediate coupling rings defining internal spline teeth meshing with the drive shaft spline teeth and the driven shaft spline teeth respectively and each also defining external spline teeth thereon, a torque tube defining internal spline teeth at either end thereof meshing with the external spline teeth of said first and second coupling rings, first guiding means defining a socket at one end thereof pivotable about said drive shaft pilot stub and connected at the other end to said second intermediate coupling ring, said first guiding means also defining a semispherical piloting portion located at a point E substantially one-quarter of the distance from said point D to said point C, and second guiding means defining a second socket pivotable about said piloting portion, said second guiding means being connected at the other end to said first intermediate coupling ring, whereby the angular misalignment in each set of meshing spline teeth is substantially one-fourth of the total angular misalignment between the drive shaft and the driven shaft.

References Cited in the file of this patent
UNITED STATES PATENTS

| | | |
|---|---|---|
| 2,679,734 | Morey | June 1, 1954 |
| 2,712,740 | Boyd | July 12, 1955 |
| 2,924,954 | Panhard | Feb. 16, 1960 |
| 2,975,620 | Shipley et al. | Mar. 21, 1961 |
| 3,010,294 | Spier | Nov. 28, 1961 |